3,623,876
SILVER HALIDE EMULSIONS CONTAINING YELLOW-FORMING COLOR COUPLERS

Francis George Hunt, Marsh, England, assignor to Ilford Limited, Ilford, Essex, England
No Drawing. Filed Apr. 30, 1970, Ser. No. 33,486
Claims priority, application Great Britain, May 1, 1969, 22,354/69
Int. Cl. G03c 1/40
U.S. Cl. 96—100    2 Claims

ABSTRACT OF THE DISCLOSURE

This application describes a yellow color coupler of the formula:

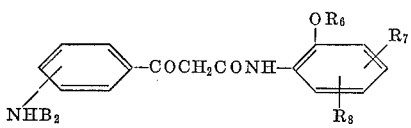

wherein $B_2$ is a ballasting group of the general formula:

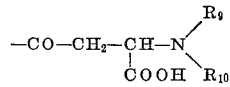

wherein $R_9$ is an acyl group and $R_{10}$ is an alkyl, cycloalkyl, aralkyl, aryl or substituted aryl group, $R_6$ is alkyl, aralkyl, aryl or substituted alkyl, aralkyl and aryl and $R_7$ and $R_8$ are each selected from alkyl, aralkyl, aryl, alkoxy, aralkoxy, aryloxy, halogen, hydrogen, sulphonamide, substituted sulphonamide or acylamide but not more than one of $R_7$ or $R_8$ is hydrogen.

---

This invention relates to yellow color couplers for use in color photography.

In British patent specification No. 830,797 there are claimed new color couplers of the general Formula I:

$$A\text{—}NH\text{—}CO\text{—}CHR_1\text{—}CHR_2\text{—}COOY \qquad (I)$$

where Y is a hydrogen atom or an alkyl, cycloalkyl or aralkyl radical, either $R_1$ or $R_2$ is a hydrogen atom and the other is —$N.R_3$ acyl or has the Formula II:

where $R_3$ is a hydrogen atom or an alkyl, cycloalkyl, aralkyl or aryl radical, Z is an ethylene, phenylene or tetrahydrophenylene radical and A—NH— is the residue of a color coupler as defined.

The remainder of this structure, i.e.

$$\text{—}CO\text{—}CHR_1\text{—}CHR_2\text{—}COOY$$

may be considered as a ballasting group which comprises solubilising groups. This ballasting group is hereinafter referred to as the group B.

In British patent specification No. 830,797 there are described certain yellow color couplers, e.g. the compounds of Examples 6 and 35.

These yellow color couplers may be said to be members of a class having the general Formula III:

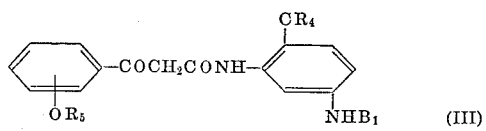

wherein $R_4$ and $R_5$ are each lower alkyl groups containing from 1 to 4 carbon atoms and $B_1$ is a ballasting group as hereinbefore defined which comprises at least one long chain alkyl group.

It has now been found that yellow color couplers embraced within the claims of British patent specification No. 830,797 but of a different structure to the yellow color couplers of Formula III are obtainable which have certain advantages over the yellow color couplers of the above Formula III. A principal advantage lies in the optical clarity of the dye images obtained.

According to the present invention there is provided a yellow color coupler of the general Formula IV:

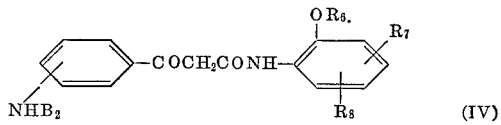

wherein $B_2$ is a ballasting group of the general Formula V:

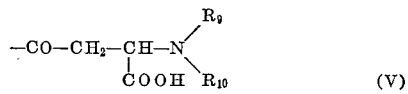

wherein $R_9$ is an acyl group and $R_{10}$ is an alkyl, cycloalkyl, aralkyl, aryl or substituted aryl group, $R_6$ is alkyl, aralkyl, aryl or substituted alkyl, aralkyl and aryl and $R_7$ and $R_8$ are hydrogen, alkyl, aralkyl, aryl, alkoxy, aralkoxy, aryloxy, halogen, sulphonamide, substituted sulphonamide or acylamido, but not more than one of $R_7$ or $R_8$ is hydrogen.

Because the yellow color couplers of the present invention are of use primarily as substantive color couplers, i.e. color couplers which are incorporated in a photographic emulsion in the photographic material, it is preferred that there is present in at least one of the groups $R_9$ or $R_{10}$ a long chain alkyl group which comprises at least 12 carbon atoms.

Examples of suitable acyl groups are acetyl propionyl, n-butyryl, isobutyryl, benzoyl, substituted benzoyl and acyl groups which comprise a long chain alkyl group, for example lauroyl, stearoyl and caproyl.

Examples of suitable alkyl groups are methyl, ethyl, butyl, heptyl, isobutyl, isoamyl, tertiary octyl and long chain alkyl groups, for example dodecyl, cetyl and octadecyl.

Examples of suitable cycloalkyl groups are cyclohexyl and hexahydrobenzyl.

Examples of suitable aralkyl groups are benzyl and p-dodecylbenzyl.

Examples of suitable aryl groups are phenyl and naphthyl.

Examples of suitable substituted aryl groups are phenyl groups substituted in the para, meta or ortho position with an alkyl, alkylthio or alkoxy group.

Particularly useful yellow color couplers of general Formula IV are those wherein (i) $B_2$ is a group of the general Formula VI:

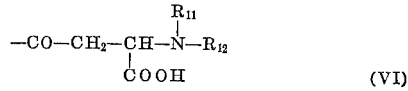

wherein $R_{11}$ is a lower acyl group, i.e. an acyl group which comprises from 2 to 6 carbon atoms and $R_{12}$ is a long chain alkyl group, e.g. octadecyl.
and wherein (ii) $B_2$ is a group of the general Formula VII:

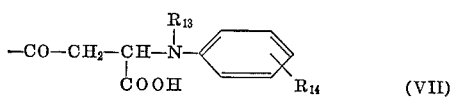

wherein $R_{13}$ is a lower acyl group, i.e. an acyl group which comprises from 2 to 6 carbon atoms and $R_{14}$ is a long chain alkyl group, i.e. a straight chain alkyl group which comprises at least 12 carbon atoms linked either directly or via a —S— or —O— linkage to the phenyl group in the para, meta or ortho position.

The yellow color couplers of the present invention may be prepared by reacting an amino-substituted yellow color coupler residue D—NH$_2$ with an anhydride of the general Formula VIII:

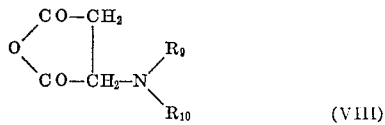

wherein R$_9$ and R$_{10}$ have the meaning hereinbefore assigned to them and DNH$_2$ has the general formula IX:

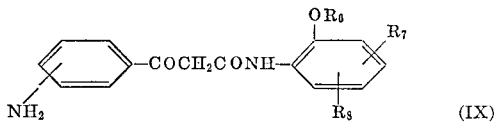

wherein R$_6$, R$_7$ and R$_8$ have the meanings hereinbefore assigned to them.

Examples of compounds of Formula IX are 3'-aminobenzoylacet-2-methoxy-5-methylanilide and 3' - aminobenzoylacet-2-methoxy-5-chloroanilide.

It is to be understood that the ballasting group B$_2$ is within the terms of the definition of ballasting group B$_1$ as hereinbefore defined and that one of the chief differences between the yellow color couplers of this invention and those of Formula III lies in the fact that the respective ballasting groups are attached to different phenyl groups of the color coupler residue.

A yellow color coupler which is within the terms of general Formula III and which has been used in color photographic material has the Formula X:

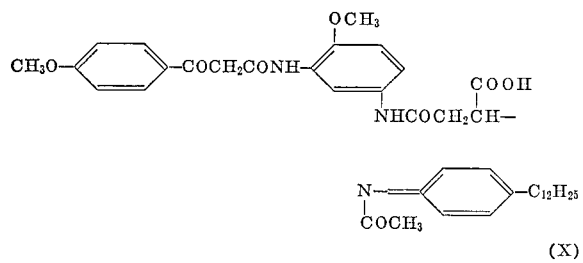

This compound has been compared with the compound of Example II which follows. The compound of Example II has the Formula XI:

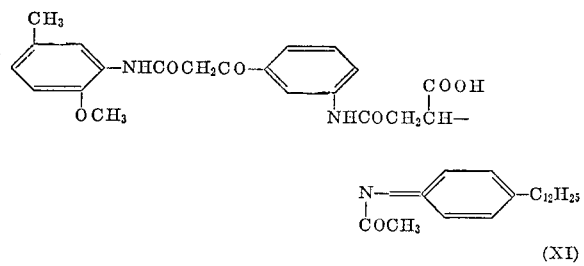

Two samples of color photographic material (a) and (b) were prepared (a) containing in the blue sensitive layer a color coupler of Formula X and (b) containing in the blue sensitive layer a color coupler of Formula XI. Both materials were exposed and reversal processed. The yellow image in (a) was found not to be optically clear and had a matte appearance while the yellow image in (b) was almost completely optically clear.

In the production of photographic material having substantive color couplers it is desirable that the ratio of coupler to gelatin binder is as high as possible, provided alway that the layer, when coated is coherent and as thin as possible. It has been found that difficulties are experienced due to incomplete bleaching during the processing of exposed color photographic material which comprises a coupler of Formula X which has the high coupler/gelatin ratio. However when the color photographic material which comprises a coupler of Formula XI having the same high coupler/gelatin ratio is processed no difficulties due to incomplete bleaching of the silver during processing are encountered.

The following examples will serve to illustrate the invention.

EXAMPLE 1

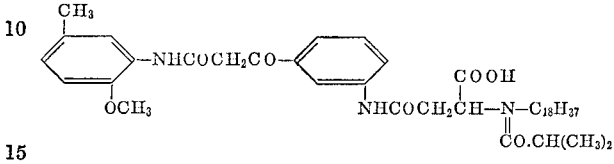

4.37 parts of N-n-octadecyl - isobutyrylaminosuccinic anhydride is dissolved in 16 parts acetone at the boil. 3.0 parts 3-aminobenzoylacet - 2' - methoxy - 5' - methylanilide is added portionwise with boiling. A complete solution is formed which on standing and cooling deposits an appreciable amount of a crystalline precipitate. The mixture is heated to 50° C. and after stirring for 1 hour at 50° C. the crystalline precipitate is filtered off and washed with acetone. The dried product, 7.0 parts, is a white solid of M.P. 135–137° C.

The 3-aminobenzoylacet - 2' - methoxy - 5' - methylanilide is obtained as follows. 51 parts 3-nitrobenzoylacet-2'-methoxy - 5' - methylanilide is added portionwise over 1½ hours to a gently boiling mixture of 1000 parts absolute alcohol and a solution of 67.5 parts sodium sulphide crystals in 50 parts water. The mixture is boiled under reflux for a further 4 hours. The absolute alcohol is distilled off with steam and the aqueous brown solution obtained is screened to remove a trace of black insoluble matter. The solution is cooled in an ice/water bath and 30 parts ammonium chloride added. The product, which precipitates initially in a sticky form rapidly hardens. It is filtered off, washed with water and dried. There results 42.5 parts of a pale yellow solid of M.P. 125–127° C. Crystallisation from methylated spirits gives a product of M.P. 138–139° C. buff colored felty needles.

The 3-nitrobenzoyl-2'-methoxy-5'-methylanilide is obtained as follows: 47.5 parts m-nitrobenzoylacetic ester is dissolved in 350 parts xylene and the mixture raised to the boil. The mixture is distilled via a fractionating column, collecting approximately 50 parts of distillate to ensure that the reaction mixture is free of moisture. The mixture is cooled to below 100° C. and 27.5 parts 2-methoxy-5-methylaniline is added. The mixture is raised to the boil and distillation allowed to proceed. Distillation is continued so that over approximately ¾–1 hour some 8–10 parts distillate are collected at column head temperature 78–85° C. The reaction is complete when the column head temperature rises rapidly to 136° C. The reaction mixture which has partially crystallised is cooled to room temperature and filtered. The yellow crystals are washed with xylene and dried. There results 57 parts greenish yellow crystals of M.P. 195–200° C. Crystallization from glacial acetic acid gives yellow crystals M.P. 205–206° C.

The N-n-octadecyl-iso-butyrylaminosuccinic anhydride may be obtained by the method of British patent specification No. 830,797.

EXAMPLE 2

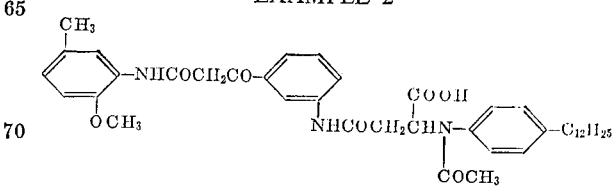

4.0 parts of N-[p-n-dodecylphenyl]acetylamino succinic anhydride is dissolved in 16 parts acetone at the boil. 3.0 parts 3-aminobenzoyl - acet - 2' - methoxy-5'-methylanilide is added portionwise with boiling. The complete solution which is obtained is allowed to cool whereupon a crystalline precipitate is formed. The mixture is reheated to 50° C. and after stirring for 1 hour at 50-60° C. it is filtered. The precipitate is washed with acetone and dried. The dried product (3.2 parts) is a white powder of M.P. 157-159° C.

The N-[p-n-dodecylphenyl]acetylamino succinic anhydride may be obtained by the method of British patent specification No. 830,797.

EXAMPLE 3

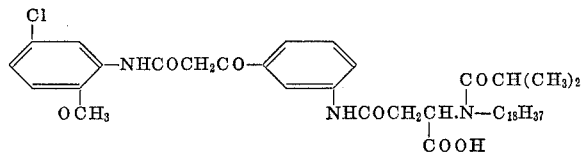

4.37 parts of N-n-octadecyl-iso-butyrylamino succinic anhydride in 16 parts acetone is reacted with 3.2 parts 3-aminobenzoylacet-2'-methoxy-5'-chloroanilide in a similar manner to that described in Example 1. There results 5.5 parts buff colored solid of M.P. 160-163° C.

The 3-aminobenzoylacet-2'-methoxy-5'-chloroanilide is obtained in the folowing manner. 54 parts of 3-nitrobenzoylacet-2'-methoxy-5'-chloroanilide is treated in a similar manner as described above in the preparation of 3-aminobenzoylacet-2'-methoxy-5'-methylanilide. There is obtained 44 parts of a yellow buff solid of M.P. 125-130° C. After crystallisation from methylated spirits it has M.P. 128-129° C.

The 3-nitrobenzoylacet-2'-methoxy-5'-chloroanilide is obtained in the following manner. 47.5 parts m-nitrobenzoylacetic ester is reacted with 32 parts 5-chloro-2-methoxyaniline in a similar manner as described above in the preparation of 3-nitrobenzoylacet-2'-methoxy-5'-methylanilide. There are obtained 60.7 parts dull green crystals of M.P. 215-221° C. Crystallization from o-dichlorobenzene gives greenish-yellow nodules of M.P. 227-228° C.

EXAMPLE 4

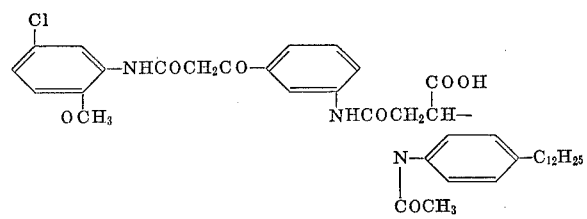

3.19 parts 3-aminobenzoylacet-2'-methoxy-5'-chloroanilide is reacted with 4.0 parts N-[p-n-dodecylphenyl]-acetylamino succinic anhydride in 16 parts acetone in a similar manner to Example 2. There is obtained 5.0 parts of a white crystalline solid of M.P. 160-163° C.

EXAMPLE 5

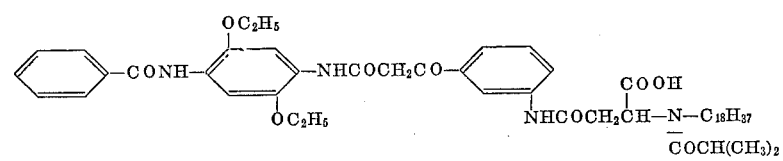

4.61 parts of 3-aminobenzoylacet - 2'5' - diethoxy-4'-benzoylamino anilide is reacted with 4.37 parts N-octadecyl-iso-butyrylamino succinic anhydride dissolved in 50 parts dry acetone in a similar manner to Example 1. There is obtained 4.6 parts of off-white crystalline solid of M.P. 155-159° C.

The 3 - aminobenzoylacet-2'5'-diethoxy-4'-benzoylaminoanilide is obtained in the following manner. 9.8 parts of 3 - nitrobenzoylacet-2'5'-diethoxy-4'-benzoylaminoanilide dissolved in 100 parts of absolute alcohol at room temperature by the addition of 17 parts 2 N caustic soda solution (1.7 equivalents) is reduced at room temperature and pressure with hydrogen using a palladium/charcoal catalyst. The mixture is filtered and the filtrate diluted with 100 parts of water. 30 parts of ammonium chloride is added with good stirring to precipitate the product which is filtered off, washed with water and dried. There is obtained 7.1 parts of buff solid. After crystallisation from n-butanol it has M.P. 159-162° C.

The 3-nitrobenzoylacet-2'5'-diethoxy-4'-benzoylaminoanilide is obtained in the following manner. 78 parts of m-nitrobenzoylacetic ester is reacted in 600 parts xylene with 117 parts 2,5-diethoxy-4-benzoylamino aniline in a similar manner to that described for 3-nitrobenzoylacet-2'-methoxy-5'-methylanilide. There is obtained 133 parts of yellow crystals. After crystallisation from glacial acetic acid the material has M.P. 179-181° C.

EXAMPLE 6

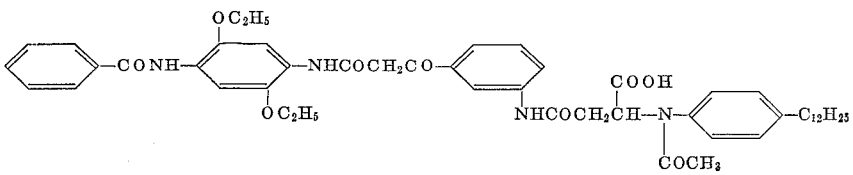

6.9 parts of 3-aminobenzoylacet-2'5'-diethoxy-4'-benzoylaminoanilide is reacted with 6.0 parts of N-[p-n-dodecylphenyl]acetylaminosuccinic anhydride in 100 parts acetonitrile by boiling under reflux for 5 hours. The mixture is cooled and the yellow solid filtered off. Crystallisation from glacial acetic acid yields 4.3 parts of buff solid of M.P. 183-185° C.

EXAMPLE 7

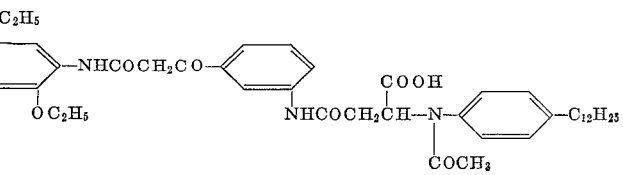

6.0 parts of 3-aminobenzoylacet-2'-methoxy-5'-diethylsulphonamido anilide is reacted with 5.9 parts N-n-octadecyl-iso-butyrylamino succinic anhydride in 100 parts acetone at the boil for 6 hours. The acetone is removed by distillation and the residual yellow gum stirred with petroleum ether to solidify the gum. The product after crystallisation from cyclohexane has M.P. 80-93° C.

The 3-amidobenzoylacet-2'-methoxy-5'-diethylsulphonamidoanilide is obtained in the following manner. 9.0 parts of 3-nitrobenzoylacet-2'-methoxy-5'-diethylsulphonamidoanilide is dissolved in 90 parts absolute alcohol and 15 parts 2 N caustic soda solution (1.5 equivalents) at room temperature and reduced in a similar manner to that described for 3-aminobenzoylacet-2'5'-diethoxy-4'-benzoylaminoanilide. There is obtained 7 parts of buff colored solid which after crystallisation from methylated spirits has M.P. 153-157° C.

The 3-aminobenzoylacet-2'-methoxy-5'-diethylsulphonamidoanilide is obtained as follows. 78 parts 3-nitrobenzoylacetic ester reacted in 600 parts xylene with 100 parts 2-methoxy-5-diethylsulphonamidoaniline in a similar manner to that described for 3-nitrobenzoylacet-2'-methoxy-5'-methyl anilide. There is obtained 122 parts of yellow solid which after crystallisation from glacial acetic acid has M.P. 164–168° C.

EXAMPLE 8

To 45.5 parts of a gelatino silver iodo-bromide emulsion there is added 40 parts of a 7½% aqueous methylated spirits solution of the potassium salt of the color coupler of Example 2. The emulsion so obtained is coated on film base and dried. When the photographic layer is exposed to blue light, developed in a color developing solution containing N:N-di-β-hydroxyethyl p-phenylenediamine, bleached and fixed, an optically clear yellow image is obtained which has an absorption maximum at a wavelength of light of 435 mμ.

EXAMPLE 9

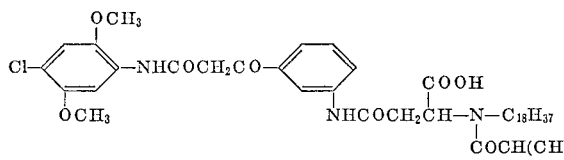

1.74 parts of 3-aminobenzoylacet-2':5'-dimethoxy-4'-chloroanilide is dissolved in 10 parts acetone with warming. 2.18 parts of N-n-octadecyl-isobutyrylamino succinic anhydride is added and the mixture heated at 40–45° C. for 2½ hours. The mixture is allowed to cool and the white precipitate is filtered off. The precipitate is washed on the filter with acetone and dried at 60° C. The dried product, 2.1 parts is a white solid M.P. 165–170° C.

The 3-aminobenzoylacet-2':5'-dimethoxy-4'-chloroanilide is obtained as follows. 42.7 parts of 3-nitrobenzoylacet-2':5'-dimethoxy-4'-chloroanilide is dissolved in 800 parts of absolute alcohol by adding 56 parts 2 N caustic soda solution and heating to the boil. The solution is reduced at room temperature and pressure with hydrogen using a palladium/charcoal catalyst and takes approximately 1½ hours. The spent catalyst is filtered off and the filtrate diluted with an equal volume of water. 85 parts of ammonium chloride is added and the mixture stirred for 2 hours. The precipitated product is filtered off, washed with water and dried at 60° C. There is obtained 36 parts of pale yellow powder, M.P. 152–153° C. After crystallisation from methylated spirits the product has M.P. 154–155° C.

The 3 - nitrobenzoylacet - 2':5' - dimethoxy - 4'-chloroanilide is obtained in the following manner. 56.2 parts m-nitrobenzoylacetic ester is reacted in 350 parts xylene with 37.5 parts 4-chloro-2:5-dimethoxyaniline in a similar manner to that described for 3-nitrobenzoylacet-2'-methoxy-5'-methylanilide. There is obtained 64.8 parts greenish yellow crystals which after crystallisation from glacial acetic acid have M.P. 172–174° C.

EXAMPLE 10

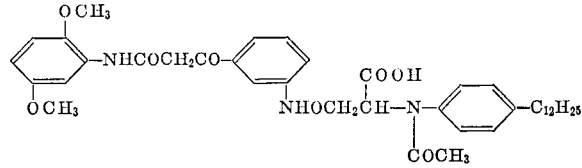

1.72 parts of 3 - aminobenzoylacet - 2':5'-dimethoxyanilide is dissolved in 10 parts acetone with warming. 2.0 parts phenyl acetylamino succinic anhydride is added and the mixture is heated at 40–45° C. for 4 hours. After cooling the white precipitate is filtered off and and washed with acetone. The product is dried at 60° C. There results 2.0 parts of white powder M.P. 164–168° C.

The 3-aminobenzoylacet - 2':5' - dimethoxyanilide is obtained in a similar manner to 3-aminobenzoylacet-2':5'-dimethoxy - 4' - chloroanilide by the catalytic reduction of 39 parts of 3-nitrobenzoylacet-2':5'-dimethoxy anilide with hydrogen. There is obtained 31 parts of an off-white powder which after crystallisation from methylated spirits has M.P. 122–123° C.

The 3 - nitrobenzoylacet - 2':5' - dimethoxyanilide is obtained in a similar manner to that described for 3-nitrobenzoylacet-2'-methoxy-5'-methyl anilide. 56.2 parts of m-nitrobenzoylacetic ester is reacted in 850 parts xylene with 31 parts 2:5-dimethoxyaniline. There is obtained 40 parts greenish yellow crystals M.P. 195–196° C.

EXAMPLE 11

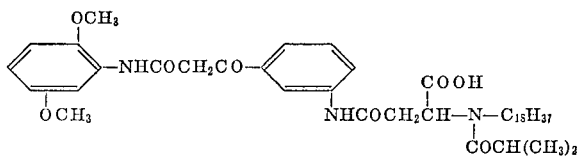

3.44 parts of 3-aminobenzoylacet-2':5'-dimethoxyanilide is dissolved in 10 parts acetone with warming. 4.37 parts of N-n-octadecyl isobutyryl amino succinic anhydride is added and the mixture heated at 40–45° C. for 4 hours. The mixture is allowed to cool and the white precipitate is filtered off. The precipitate is washed on the filter with acetone and dried at 60° C. The dried product, 6.7 parts, has M.P. 167–168° C.

EXAMPLE 12

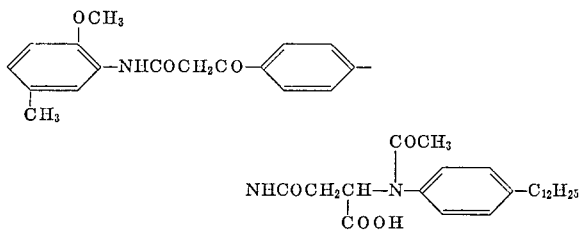

2.0 parts of 4-aminobenzoylacet-2'-methoxy-5'-methylanilide is dissolved in 10 parts acetone with warming. 2.7 parts N(p-n-dodecylphenyl) acetylamino succinic anhydride is added and the mixture heated at 40–50° C. for 8 hours. The mixture is allowed to cool and the white precipitate is filtered off. The precipitate is washed on the filter with acetone and dried at 60° C. The dried product is a white powder M.P. 162–164° C.

The 4 - aminobenzoylacet - 2' - methoxy - 5' - methylanilide is obtained as follows. 58 parts 4-nitrobenzoylacet-2'-methoxy-5'-methylanilide is dissolved in 1000 parts absolute alcohol with 95 parts 2 N caustic soda solution. The solution is reduced with hydrogen under 50 atmospheres pressure at 50–60° C. with Raney nickel as catalyst. The spent catalyst is filtered off and the filtrates diluted with 860 parts of water. 37.5 parts of ammonium chloride is added with stirring and the precipitated product filtered off. The product is washed on the filter with water and dried at 60° C. There results 56.6 parts of buff powder which after crystallisation from methylated spirits has M.P. 157–159° C.

The 4 - nitrobenzoylacet - 2' - methoxy - 5' - methylanilide is obtained in a similar manner to that described for 3-nitrobenzoylacet-2'-methoxy - 5' - methylanilide. 48.5 parts 4-nitrobenzoylacetic ester is reacted in 330 parts xylene with 30.1 parts 2-methoxy-5-methylaniline. There is obtained 58.2 parts bright yellow crystalline solid M.P. 168–169° C.

EXAMPLE 13

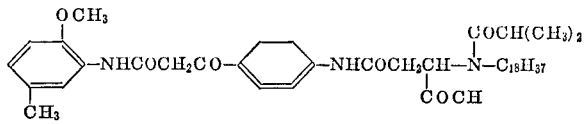

2.0 parts of 4-aminobenzoylacet-2'-methoxy-5'-methylanilide is dissolved in 10 parts acetone with warming. 2.95 parts N-n-octadecylisobutyrylamino succinic anhydride is added and the mixture heated at 40–50° C. for 8 hours. The mixture is allowed to cool and the white precipitate filtered off. The precipitate is washed on the filter with acetone and dried at 60° C. The dried product is a white power M.P. 172-175° C.

EXAMPLE 14

To 59.5 parts of a gelatino silver chlorobromide emulsion there is added 40 parts of a 7½% aqueous methylated spirits solution of the potassium salt of the color coupler of Example 9. The emulsion so obtained is coated on paper base and dried. When the photographic layer is exposed to blue light, developed in a developing solution containing N:N-di-β-hydroxyethyl-p-phenylene diamine, bleached and fixed, a bright yellow image is obtained which has an absorption maximum of light of 446 m$\mu$.

EXAMPLE 15

A photographic layer is prepared in the same manner as Example 8 but using the potassium salt of the color coupler of Example 4. When the layer is treated as in Example 8 an optically clear yellow image is obtained with an absorption maximum of 443 m$\mu$.

EXAMPLE 16

A photographic layer is prepared in the same manner as Example 8 but using the potassium salt of the color coupler of Example 5. When the layer is treated as in Example 8 an optically clear yellow image is obtained with an absorption maximum of 437 m$\mu$.

EXAMPLE 17

A photographic layer is prepared in the same manner as Example 8 but using the potassium salt of the color coupler of Example 7. When the layer is treated as in Example 8 an optically clear yellow image is obtained with an absorption maximum of 445 m$\mu$.

I claim as my invention:

1. A photographic silver halide emulsion layer which contains at least one yellow color coupler of the formula:

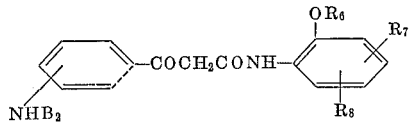

wherein $B_2$ is a ballasting group of the formula:

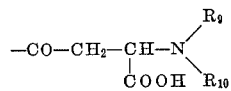

wherein $R_9$ is an acyl group and $R_{10}$ is an alkyl, cycloalkyl, aralkyl or aryl $R_6$ is alkyl, aralkyl or aryl and $R_7$ and $R_8$ are hydrogen, alkyl, aralkyl, aryl, alkoxy, aralkoxy, aryloxy, halogen, sulphonamide, or acylamide but not more than one of $R_7$ or $R_8$ is hydrogen and at least one of $R_9$ and $R_{10}$ contains a long chain alkyl group of at least 12 carbon atoms.

2. Color photographic material which comprises at least one silver halide emulsion layer which contains at least one yellow color coupler of the formula:

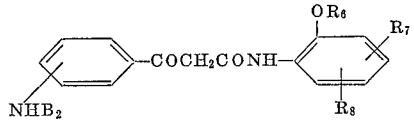

wherein $B_2$ is a ballasting group of the formula:

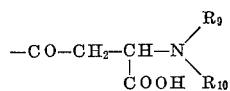

wherein $R_9$ is an acyl group and $R_{10}$ is an alkyl, cycloalkyl, aralkyl or aryl, $R_6$ is alkyl, aralkyl or aryl and $R_7$ and $R_8$ are hydrogen, alkyl, aralkyl, aryl, alkoxy, aralkoxy, aryloxy, halogen, sulphonamide, or acylamide, but not more than one or $R_7$ or $R_8$ is hydrogen and at least one of $R_9$ and $R_{10}$ contains a long chain alkyl group of at least 12 carbon atoms.

References Cited

UNITED STATES PATENTS 3,328,419   6/1967   Anderson     96—100
3,383,214   5/1968   Anderson     96—100

FOREIGN PATENTS 830,797   7/1968   Great Britain     96—100

J. TRAVIS BROWN, Primary Examiner

U.S. Cl. X.R.

260—562